Dec. 9, 1952 L. G. ERICKSON ET AL 2,621,254
MULTICHANNEL TRANSMITTING AND RECEIVING SYSTEM
Filed May 18, 1951
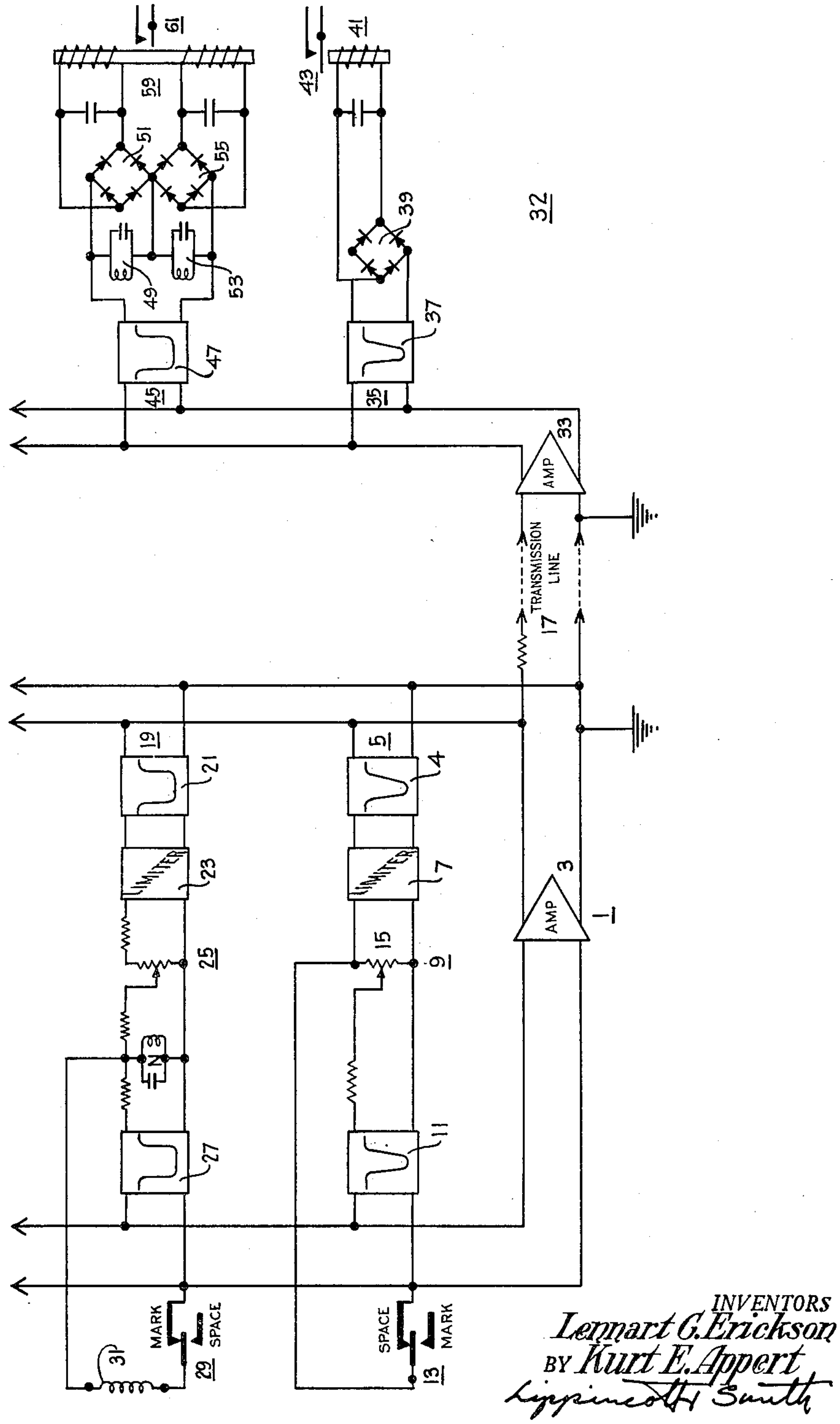
INVENTORS
Lennart G. Erickson
BY Kurt E. Appert
Lippincott & Smith
ATTORNEY'S Patented Dec. 9, 1952

2,621,254

UNITED STATES PATENT OFFICE 2,621,254

MULTICHANNEL TRANSMITTING AND RECEIVING SYSTEM

Lennart G. Erickson, Hillsborough, and Kurt E. Appert, Atherton Heights, Calif., assignors to Lenkurt Electric Co., Inc., San Carlos, Calif., a corporation of Delaware Application May 18, 1951, Serial No. 227,086

5 Claims. (Cl. 178—51)

This invention relates, generally, to improvements in multichannel frequency transmitting and receiving systems. More specifically, there is provision for a multichannel frequency generator adapted to operate as a carrier supply system for either frequency shift keying or "On-Off" keying, or both. Also, a receiver is provided which is capable of actuation by either type keying or by the simultaneous appearance of both types.

With the advent of present day amplifiers capable of handling wide frequency bands, we have found that it is no longer necessary to employ an individual amplifier for each carrier supply frequency to be transmitted or received. The present invention provides for a plurality of feedback paths associated with a wide band amplifier of this type for causing a separate frequency to be generated in each path. The generated frequencies are then each amplified in the same amplifier prior to transmission. Likewise the receiver employs a single wide band amplifier as its only means of amplification.

In the oscillator art it is well known that a feedback path associated with an amplifier will provide oscillations if the output of the amplifier is larger than the input thereto and the phase of the feedback voltage is correct.

The present invention employs in the transmitter a plurality of feedback paths each having at least frequency selecting means and amplitude limiting means included therein and a keying circuit associated therewith. Preferably, impedance matching means is also provided in each path.

This invention is capable of a high degree of flexibility in that either amplitude modulated or frequency modulated signals, or both, may be derived in the various feedback paths.

In the case of amplitude modulated frequencies, the output of the amplifier is fed to a first frequency selecting means which is designed to select the desired signal or carrier frequency. The output of this frequency selecting means is passed through a conventional limiter stage in order that a carrier frequency of uniform amplitude may be obtained and to prevent the oscillations at this particular frequency from absorbing the entire amplitude range of the amplifier. Between the limiter stage and a final frequency selecting means there is provided an adjustable impedance matching and decoupling circuit which has a keying circuit connected in shunt therewith. Further connections from a final filter allow the selected frequency to pass to the amplifier input circuit. The keying circuit is arranged so that the decoupling circuit may be shorted during the spacing intervals and hence no carrier is generated during these intervals. The keying circuit is further arranged to convey the carrier to the amplifier for transmission when the key is placed in the marking position. This, in effect, provides for the "On-Off" transmission commonly found in carrier telegraph systems.

A feedback path capable of developing frequency modulated carriers is arranged substantially as the amplitude modulating path with the exception that a parallel resonant network is provided in this path to establish a frequency shift arrangement. The key and a reactance are provided in shunt with the resonant network. Thus, when the key is open, the frequency of the signal is determined by the resonant network whereas when the key is closed, a different frequency is determined by the resonant network plus the reactance in shunt therewith. It will be readily understood that the addition of the susceptance alters the frequency of the signal. Other types of variable frequency networks can readily be substituted for the resonant network as well as the reactance in shunt therewith for controlling the frequency at which the overall circuit from amplifier input to amplifier output will have optimum characteristics for maximum positive feedback.

In accordance with this invention a simple receiving system capable of receiving either amplitude modulated or frequency modulated carriers or signals is provided. This receiver consists in a wide band amplifier having a plurality of terminating circuits whose inputs are fed in parallel from the output of the amplifier. The terminating circuits are adapted to receive either amplitude modulated or frequency modulated carriers, as the case may be, and to actuate relay means and contacts, thus yielding "On-Off" signals or frequency shift keyed signals.

A terminal circuit for receiving amplitude modulated carriers is comprised of a band-pass filter adapted to select and pass the carrier frequency. A rectifier or detector circuit is provided in the output of this band-pass filter for obtaining a D. C. voltage from the carrier which will actuate a relay controlled key to provide marks or spaces.

A terminal circuit for receiving frequency modulated carriers comprises a band-pass filter capable of selecting and passing both the marking and the spacing frequencies. Discriminating circuits and associated detecting circuits are provided for the marking and spacing signals. Polarized relays control the key contacts to denote either a marking or a spacing signal.

In a system of this nature, great economy is achieved due to the multiple use of the amplifier circuits. By employing the wide band amplifiers, all other frequency generating power sources and amplifying means are eliminated. Thus the power expended to operate a single amplifier is proportionately less than that which has heretofore been required. Further, increased reliability is realized due to the simplification of the circuit operation which results in the employment of fewer tubes and thus reduces power consumption.

Accordingly, it is an object of this invention to provide a multichannel frequency generator wherein the operation of each frequency generating circuit is independent of all others and is individually adjustable both as to frequency and power output.

A further object of the present invention is the provision of a multichannel frequency generator which employs only a single amplifier.

A further object is the provision of a simple system for multichannel carrier frequency transmission and reception suitable for use in carrier signalling, dialling, telegraph, telephone and telemetering systems.

A further object is the provision of a system of the hereinbefore described type capable of a high degree of flexibility for modification thereof.

This invention will now be explained in detail in conjunction with the accompanying drawing wherein:

The single figure shows a transmitter and a receiver adapted to operate on the principles hereinbefore set forth.

The transmitter shown at 1 comprises an amplifier 3 which has a number of feedback paths, only two of which are shown. Feedback path 5 includes frequency selecting means 4, a limiter stage 7, a decoupling and impedance matching circuit 9 and frequency limiting means 11, all arranged in electrical series connection. A key 13 and associated keying circuit are connected to the decoupling circuit 9. This feedback path is capable of developing an amplitude modulated signal provided the loss occurring in the path is less than the gain of the amplifier, and further, provided the phase of the voltage fed back to this path is proper.

Both frequency selecting means may comprise conventional band-pass filters, sharply tuned circuits or other types of selecting circuits. The filter 4 is designed to select the frequency which will be generated in feedback path 5, and accordingly it is necessary to this circuit arrangement. On the other hand, filter 11 is only required when the output of the decoupling circuit is badly distorted.

The limiter stage 7 may comprise any of the conventional circuits which will limit the amplitude of a frequency passing through, such as, for example, back-to-back diodes, "Thyrite" negative resistors connected in shunt with the output terminals of filter 4, or tungsten or other positive characteristic resistors connected in series with the output terminals of filter 4. Limiter circuits of the latter two types do not distort the signal waveform and thus aid in the elimination of filter 11.

The decoupling and impedance matching circuit 9 includes a potentiometer or gain control 15 by which the proportion of the energy, passing the limiter, which is fed back to the amplifier may be regulated, thus controlling the amplitude of the oscilaltions generated at this frequency and hence the power available for use in the communication channel.

The key 13 is shown as being of the back contact type. Convention requires that when the key is depressed, a mark or "On" signal be produced, whereas when the key is in the other position, a space or "Off" signal should be produced. Since hand keying is frequently employed for "On-Off" signalling, this key 13 was shown as the back contact type. The key may be considered as purely symbolic; printer telegraph, dialling mechanism or other mechanical keying may of course be substituted.

In operation the filter 4 determines the frequency of path 5. With the key in the spacing position (as shown), a short circuit is impressed across potentiometer 15, thus allowing no output from the path and accordingly an "Off" signal is produced. With the key in the marking position, potentiometer 15 is no longer shorted and the frequency characteristic of path 5 will then pass through filter 11 to amplifier 3 where it is amplified and furnished to transmission line 17. The line 17 is shown only by way of illustration, because the present invention is readily adaptable for radio transmission.

A feedback path 19 also associated with wide band amplifier 3 is capable of producing frequency modulated signals. This feedback path could be similar to path 5 and thus produce amplitude modulated signals, but is shown here as being a frequency modulating path in order to stress the flexibility present in this invention. This path contains frequency selecting means 21 which may be of a type similar to frequency selecting means 4, although it should have limited band-pass characteristics which are not necessary in path 5, because filter 4 could be merely a tuned circuit. The filter 21, however, is designed to select frequencies different from those generated in path 5. A limiter stage 23, which also may be similar in construction to limiter 7, is connected to the output terminals of filter 21. It might be emphasized here that the power present in a given circuit is directly proportional to the square of the amplitude of the signal present. Thus the limiter 23 is employed to control the power in feedback path 19.

A decoupling and impedance matching circuit 25 connects the output of the limiter stage 23 to frequency selecting means 27, the output of which feeds wide band amplifier 3. This circuit, though similar to circuit 9, contains a resonant network N. Key 29 is connected in series with a reactor 31 and the combination is connected in parallel with the resonant network N. The network N, per se, is tuned to oscillate at a frequency which is in the lower portion of the range which filter 21 will pass. Thus, when key 29 is in the spacing position, the frequency output is determined by network N. However, when the key is in the marking position (as shown), reactor 31 shunts network N and thus a higher output frequency is produced (this, of course, assumes that the reactor 31 is of the inductive type). It will be obvious that a capacitor or a combination of capacitors and inductors may readily replace reactor 31. The feedback path 19 thus is capable of producing two frequencies, one designated as a marking frequency, and the other a spacing frequency. The arrangement of the key contacts is believed to be relatively unimportant here because, ordinarily, a printer relay is associated with a frequency shift keying circuit, and accordingly the relay may be actuated in any desired manner.

An indefinite number of feedback paths may be associated with amplifier 3 to produce a plurality of signal channels. These feedback paths may all be of the amplitude modulating types or all of the frequency modulating type, or part amplitude modulating and part frequency modulating, as is represented herein. The only limitation on the number of such paths is the power available in the amplifier. Except for the frequency bands of the filters these paths may be identical to either path 5 or path 19.

The receiving circuit shown at 32 employs a wide band amplifier 33 comparable to amplifier 3. A plurality of terminating circuits, only two of which are shown, are associated with this amplifier. These circuits are preferably arranged so that their inputs are fed in parallel from common output terminals of amplifier 33.

In conformity with the illustration of the present invention, terminating circuit 35 is adapted to receive the amplitude modulated signals developed in feedback path 5. Frequency selecting means 37 are provided to select the "On" signals and to convey them to a detector 39 where a proportionate D. C. voltage is developed which actuates relay coil 41 to control keying contacts 43. The detector 39 is illustrated as being of the bridge type, because this particular type conserves the power supplied to feedback path 35. However, any other suitable detector will work satisfactorily with the present invention.

Terminating circuit 45 is provided for receiving the frequency modulated signals developed in feedback path 19. Frequency selective means 47 are provided to admit only the spacing and marking signal frequencies which are developed in path 19. A discriminator comprising a resonant circuit 49 tuned to one of these frequencies and feeding a detector 51 and a resonant circuit 53 tuned to the other frequency and feeding detector 55 is provided. The detectors are connected in opposing relation and their differential output actuates a polarized relay 59 to operate contacts 61 supplying a printer or other final utilization device.

As the discriminator and detector circuits are well known in the art, it is believed that there is no need for further explanation concerning them.

From the foregoing it will be apparent that the number of terminating circuits must equal the number of feedback paths in order that all of the signal frequencies may be received. Further, if only amplitude modulated signals are generated, then only terminating circuits capable of actuation by amplitude modulated signals need be provided. The flexibility of the present invention makes it possible to communicate by simultaneously employing amplitude modulated and frequency modulated signal paths. The receiver need only contain corresponding terminating circuits to cooperate with the transmitter.

Having now described the invention what is claimed is:

1. In apparatus for producing a series of output frequencies, a wide band amplifier capable of substantially uniform amplification throughout said series, a plurality of feedback paths connected in parallel with said amplifier and one to another, each of said paths including frequency selective means for determining the frequency generated therein, and a plurality of keying means connected respectively to said paths for modulating said frequency generated therein.

2. The arrangement as set forth in claim 1 wherein at least one of said paths includes a resonant network and a reactor connected to be bridged across said network by actuation of said keying means.

3. The arrangement as set forth in claim 1 wherein said frequency determining means comprise band-pass filters and wherein each of said paths further includes amplitude limiting means and a decoupling and impedance matching circuit.

4. The arrangement as set forth in claim 1 including a work circuit connected to the output of said amplifier for carrying simultaneously frequencies generated through each of said paths.

5. In a system for the generation of a plurality of carrier frequencies, a wide band amplifier having input and output circuits, a plurality of feedback paths connected between said circuits, signal selective means located in each of said paths for selecting different frequencies, limiting means in each of said paths for determining the amplitudes of said frequencies, decoupling and impedance matching circuits in each of said paths, and a circuit including keying means connected to each of said decoupling and impedance matching circuits for modulating said selected frequencies.

LENNART G. ERICKSON.
KURT E. APPERT.

REFERENCES CITED

The following references are of record in the file of this patent:

UNITED STATES PATENTS

| Number | Name | Date |
|---|---|---|
| 1,802,745 | Whitaker | Apr. 28, 1931 |
| 1,988,614 | Tuczek | Jan. 22, 1935 |
| 2,271,721 | Smith | Feb. 3, 1942 |
| 2,494,370 | Swartzel et al. | Jan. 10, 1950 |
| 2,511,204 | Goldstine | June 13, 1950 |
| 2,541,320 | Bachelet | Feb. 13, 1951 |